United States Patent
Wakrat et al.

(10) Patent No.: US 8,838,877 B2
(45) Date of Patent: Sep. 16, 2014

(54) FILE SYSTEM DERIVED METADATA FOR MANAGEMENT OF NON-VOLATILE MEMORY

(75) Inventors: Nir Jacob Wakrat, Los Altos, CA (US); Vadim Khmelnitsky, Foster City, CA (US); Daniel Jeffrey Post, Campbell, CA (US)

(73) Assignee: Apple Inc., Cupertino, CA (US)

( * ) Notice: Subject to any disclaimer, the term of this patent is extended or adjusted under 35 U.S.C. 154(b) by 410 days.

(21) Appl. No.: 12/561,173

(22) Filed: Sep. 16, 2009

(65) Prior Publication Data

US 2011/0066789 A1 Mar. 17, 2011

(51) Int. Cl.
*G06F 12/00* (2006.01)

(52) U.S. Cl.
USPC ............. 711/103; 711/E12.008; 711/E12.009

(58) Field of Classification Search
USPC ........................... 711/103, E12.008, E12.009
See application file for complete search history.

(56) References Cited

U.S. PATENT DOCUMENTS

| | | | |
|---|---|---|---|
| 4,937,830 A | 6/1990 | Kawashima et al. | |
| 5,341,489 A | 8/1994 | Heiberger et al. | |
| 5,559,449 A | 9/1996 | Padoan et al. | |
| 5,613,144 A | 3/1997 | Hall et al. | |
| 5,615,162 A | 3/1997 | Houston | |
| 5,673,223 A | 9/1997 | Park | |
| 5,751,631 A | 5/1998 | Liu et al. | |
| 6,092,158 A | 7/2000 | Harriman et al. | |
| 6,134,149 A | 10/2000 | Lin | |
| 6,148,354 A | 11/2000 | Ban et al. | |
| 6,449,111 B1 | 9/2002 | Kool et al. | |
| 6,684,301 B1 | 1/2004 | Martin | |
| 7,372,715 B2 | 5/2008 | Han | |
| 7,882,071 B2 * | 2/2011 | Fachan et al. | 707/649 |
| 7,975,109 B2 | 7/2011 | McWilliams et al. | |
| 7,979,658 B2 | 7/2011 | Obereiner et al. | |
| 2002/0194451 A1 | 12/2002 | Mukaida et al. | |
| 2003/0046628 A1 | 3/2003 | Rankin | |
| 2003/0200411 A1 | 10/2003 | Maeda et al. | |
| 2004/0039934 A1 * | 2/2004 | Land et al. | 713/200 |
| 2004/0139286 A1 | 7/2004 | Lin et al. | |
| 2004/0153902 A1 | 8/2004 | Machado et al. | |
| 2004/0257888 A1 | 12/2004 | Noguchi et al. | |
| 2005/0166007 A1 | 7/2005 | Ono | |
| 2006/0059406 A1 | 3/2006 | Micheloni et al. | |
| 2006/0112222 A1 * | 5/2006 | Barrall | 711/114 |
| 2006/0164907 A1 | 7/2006 | Nguyen | |
| 2006/0248432 A1 | 11/2006 | Barrett | |
| 2007/0043900 A1 | 2/2007 | Yun | |

(Continued)

OTHER PUBLICATIONS

Lim, Seung-Ho, et al., "An Efficient NAND Flash File System for Flash Memory Storage," IEEE Transactions on Computers, vol. 55, Issue 7, Jul. 2006 pp. 906-912.

(Continued)

*Primary Examiner* — Aracelis Ruiz
(74) *Attorney, Agent, or Firm* — Meyertons, Hood, Kivlin, Kowert & Goetzel, P.C.

(57) ABSTRACT

A file system programs metadata on a non-volatile memory device. The metadata can include data associating files with ranges of logical block addresses. During a garbage collection process, the data can be used to determine portions of physical blocks of the non-volatile memory device that are associated with files that have been deleted. Using the programmed metadata during garbage collection results in erasure of larger portions of blocks and improved wear leveling.

8 Claims, 5 Drawing Sheets

(56) References Cited

U.S. PATENT DOCUMENTS

| | | | |
|---|---|---|---|
| 2007/0050668 A1 | 3/2007 | Gans | |
| 2007/0106919 A1 | 5/2007 | Chang et al. | |
| 2007/0140007 A1 | 6/2007 | Terauchi | |
| 2007/0165458 A1 | 7/2007 | Leong et al. | |
| 2007/0168625 A1 | 7/2007 | Cornwell et al. | |
| 2007/0186032 A1* | 8/2007 | Sinclair et al. | 711/103 |
| 2008/0069098 A1* | 3/2008 | Shah et al. | 370/390 |
| 2008/0098192 A1* | 4/2008 | Im et al. | 711/170 |
| 2008/0126776 A1 | 5/2008 | Takayama | |
| 2008/0147968 A1 | 6/2008 | Lee et al. | |
| 2008/0147994 A1 | 6/2008 | Jeong et al. | |
| 2008/0195799 A1 | 8/2008 | Park | |
| 2008/0211303 A1 | 9/2008 | Ikegawa | |
| 2008/0288814 A1 | 11/2008 | Kitahara | |
| 2009/0063934 A1 | 3/2009 | Jo | |
| 2009/0100115 A1* | 4/2009 | Park et al. | 707/205 |
| 2009/0113114 A1 | 4/2009 | Berenbaum et al. | |
| 2009/0164698 A1 | 6/2009 | Ji et al. | |
| 2009/0198902 A1 | 8/2009 | Khmelnitsky et al. | |
| 2009/0198947 A1 | 8/2009 | Khmelnitsky et al. | |
| 2009/0198952 A1 | 8/2009 | Khmelnitsky et al. | |
| 2009/0248954 A1* | 10/2009 | Hiraiwa et al. | 711/100 |
| 2009/0265513 A1 | 10/2009 | Ryu | |
| 2010/0057979 A1* | 3/2010 | Chu et al. | 711/103 |
| 2010/0250836 A1 | 9/2010 | Sokolov et al. | |
| 2010/0287329 A1 | 11/2010 | Toelkes et al. | |
| 2010/0287353 A1 | 11/2010 | Khmelnitsky et al. | |
| 2011/0153911 A1 | 6/2011 | Sprouse et al. | |
| 2011/0213945 A1 | 9/2011 | Post et al. | |

OTHER PUBLICATIONS

Toelkes et al., "Architecture for Address Mapping of Managed Non-Volatile Memory", U.S. Appl. No. 12/614,369, filed Nov. 6, 2009.

Toelkes et al., "Partial Page Operations for Non-Volatile Memory Systems", U.S. Appl. No. 12/536,410, filed Aug. 5, 2009.

Post et al., "Low Latency Read Operation for Managed Non-Volatile Memory", U.S. Appl. No. 12/538,053, filed Aug. 7, 2009.

Khmelnitsky et al., "Multipage Preparation Commands for Non-Volatile Memory Systems", U.S. Appl. No. 12/545,011, filed Aug. 20, 2009.

Wakrat et al., "Controller for Optimizing Throughput of Read Operations", U.S. Appl. No. 12/509,240, filed Jul. 24, 2009.

Wakrat et al., "Memory Array Power Cycling", U.S. Appl. No. 12/561,158, filed Sep. 16, 2009.

Toshiba, "TC58NVG0S3ETA00 Toshiba Mos Digital Integrated Circuit Silicon Gate CMOS," Nov. 20, 2008, revision 1.00, Semico Toshiba, pp. 1-65. http://www.semicon.toshiba.co.jp/docs/datasheet/en/Memory/TC58NVG0S3ETA00_en_datasheet_110301.pdf.

International Search Report/Written Opinion in PCT/US2009/065804 mailed May 10, 2010, 17 pages.

Invitation to Pay Additional Fees and, Where Applicable, Protest Fee in PCT/US2009/065804 mailed Mar. 4, 2010, 4 pages.

International Search Report/Written Opinion in PCT/US2010/032628 dated Aug. 11, 2010, 12 pages.

"Increasing Boot Operations with Managed NAND," QuickLogic® White Paper, Quicklogic Corporation [online], Retrieved from the Internet: <http://www.quicklogic.com/images/QL:_Increasing_Boot_Opt_w_Managed_NAND_WP_RevE.pdf>, 2007-2009, 8 pages.

"Dual supply level translator for dual memory cards (mini SD/micro SD + managed NAND)," STMicroelectronics, Paper No. ST6G3240 [online], Retrieved from the Internet: <http://www.st.com/stonline/products/literature/ds/14581.pdf>, Apr. 2008, 29 pages.

International Preliminary Report on Patentability in PCT/US2009/065804 mailed Jul. 7, 2011, 12 pages.

Authorized office Yolaine Cussac, International Preliminary Report on Patentability in PCT/US2010/32627 mailed Nov. 9, 2011, 8 pages.

International Preliminary Report on Patentability in PCT/US2010/032628 dated Nov. 9, 2011, 8 pages.

Authorized officer Jacqueline Pitard, International Search Report/Written Opinion in PCT/US2010/32627 mailed Jul. 21, 2010, 10 pages.

\* cited by examiner

FILE SYSTEM DERIVED METADATA FOR MANAGEMENT OF NON-VOLATILE MEMORY

TECHNICAL FIELD

This subject matter is related generally to access and management of managed non-volatile memory (NVM).

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate.

NAND is a type of flash memory that can be accessed like a block device, such as a hard disk or memory card. Each block consists of a number of pages (e.g., 64-128 pages). A typical page size is 4 KB-8 KB bytes. A NAND device can have multiple dies each having 4096-8192 blocks. Associated with each page are a number of bytes that are used for storage of error detection and correction checksums. Reading and programming is performed on a page basis, erasure is performed on a block basis, and data in a block can only be written sequentially. NAND relies on Error Correction Code (ECC) to compensate for bits that may flip during normal device operation. When performing erase or program operations, the NAND device can detect blocks that fail to program or erase and mark the blocks as bad in a bad block map. The data can be written to a different, good block, and the bad block map updated.

Managed NAND devices combine raw NAND with a memory controller to handle error correction and detection, as well as memory management functions of NAND memory. Managed NAND is commercially available in Ball Grid Array (BGA) packages, or other Integrated Circuit (IC) package which supports standardized processor interfaces, such as Multimedia Memory Card (MMC) and Secure Digital (SD) card. A managed NAND device can include a number of NAND devices or dies, which can be accessed using one or more chip select signals. A chip select is a control line used in digital electronics to select one chip out of several chips connected to the same bus. The chip select is typically a command pin on most IC packages, which connects the input pins on the device to the internal circuitry of that device. When the chip select pin is held in the inactive state, the chip or device ignores changes in the state of its input pins. When the chip select pin is held in the active state, the chip or device responds as if it is the only chip on the bus.

The Open NAND Flash Interface Working Group (ONFI) has developed a standardized low-level interface for NAND flash chips to allow interoperability between conforming NAND devices from different vendors. ONFI specification version 1.0 specifies: a standard physical interface (pin-out) for NAND flash in TSOP-48, WSOP-48, LGA-52, and BGA-63 packages; a standard command set for reading, writing, and erasing NAND flash chips; and a mechanism for self-identification. ONFI specification version 2.0 supports dual channel interfaces, with odd chip selects (also referred to as chip enable or "CE") connected to channel 1 and even CEs connected to channel 2. The physical interface shall have no more than 8 CEs for the entire package.

While the ONFI specifications allow interoperability, the current ONFI specifications do not take full advantage of Managed NAND solutions.

SUMMARY

A file system programs metadata on a non-volatile memory device. The metadata can include data associating files with ranges of logical block addresses. During a garbage collection process, the data can be used to determine portions of physical blocks of the non-volatile memory device that are associated with files that have been deleted. Using the programmed metadata during garbage collection results in erasure of larger portions of blocks and improved wear leveling.

DETAILED DESCRIPTION

Memory System Overview

Figure 1:
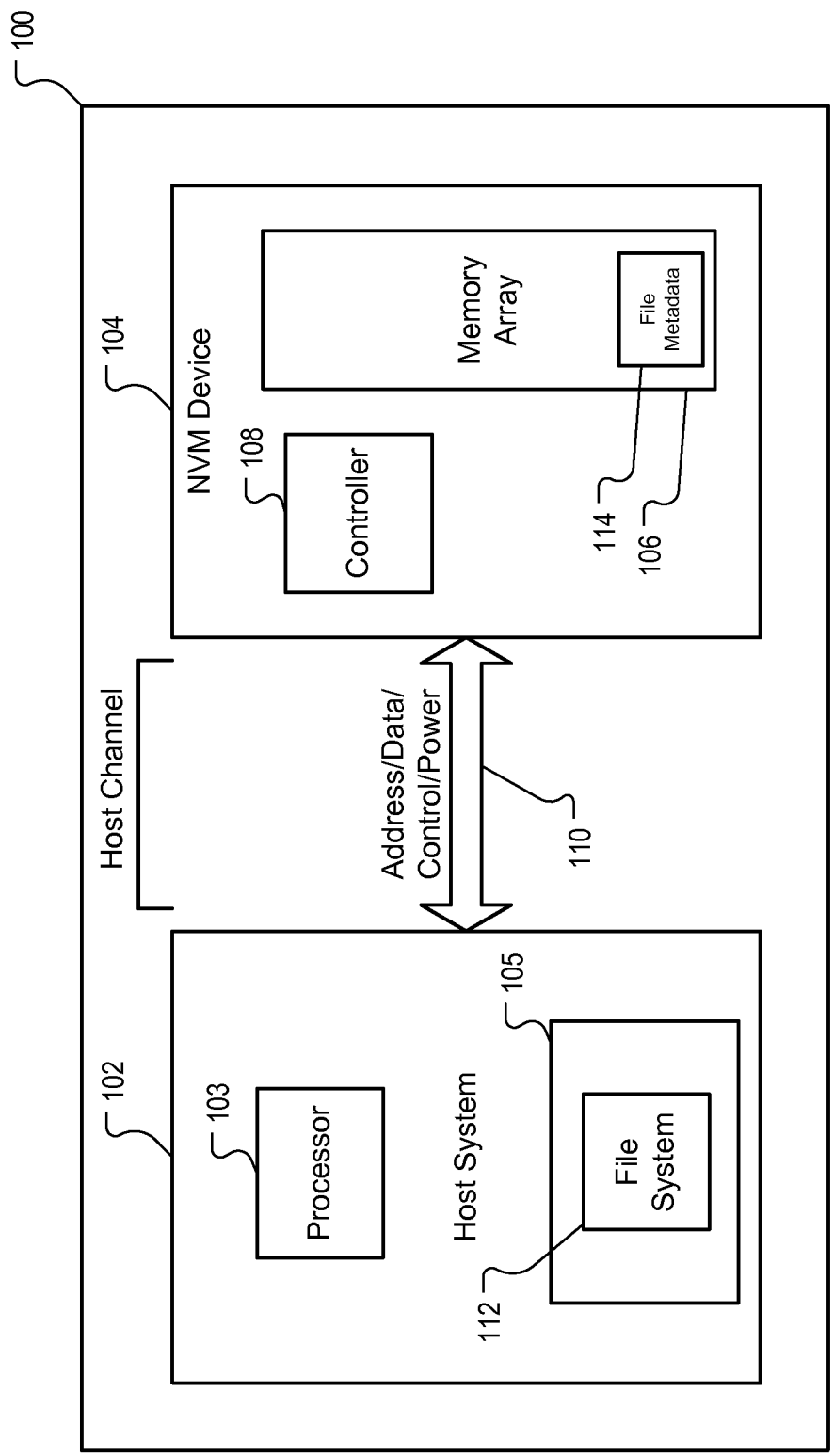
FIG. 1 is a block diagram of an example memory system including a host processor coupled to a managed NVM package.

FIG. 1 is a block diagram of an example memory system 100 including a host system 102 coupled to an NVM device 104 (e.g., a NAND device) by way of a host channel 110. The NVM device 104 can be a raw memory device (e.g., raw NAND device), or a BGA package or other IC package, including multiple NVM devices (e.g., multiple raw NAND dies). The memory system 100 can be used in a variety of devices, including but not limited to: handheld computers, mobile phones, digital cameras, portable music players, toys, thumb drives, email devices, and any other devices in which non-volatile memory is desired or required.

In some implementations, the NVM device 104 includes a controller 108 that is operable for accessing and managing the NVM device 104 over the host channel 110. In some implementations, the controller 108 can perform memory management functions (e.g., wear leveling, garbage collection) and can include an error correction (ECC) engine for detecting and correcting data errors (e.g., flipped bits).

In some implementations, the host system 102 and NVM device 104 can communicate information (e.g., control commands, addresses, data) over the host channel 110. The host channel 110 can support standard interfaces, such as raw NAND interfaces or dual channel interfaces, such as is described in ONFI specification version 2.0.

In some implementations, the host system 102 can include a processor 103, memory 105 (e.g., RAM) and various other structures (e.g., an interface for communicating over host channel 110). The memory 105 can include instructions which when executed by the processor 103 implements an operating system, including a file system 112. The file system 112 can include file system metadata, including but not limited to unique object identifiers (IDs) for identifying files in the file system 112. As described in reference to FIG. 2, the file system 112 can program the NVM device 104 with file metadata which can be used by the controller 106 to perform more efficient garbage collection and wear leveling.

Example Metadata Structure

Figure 2A:
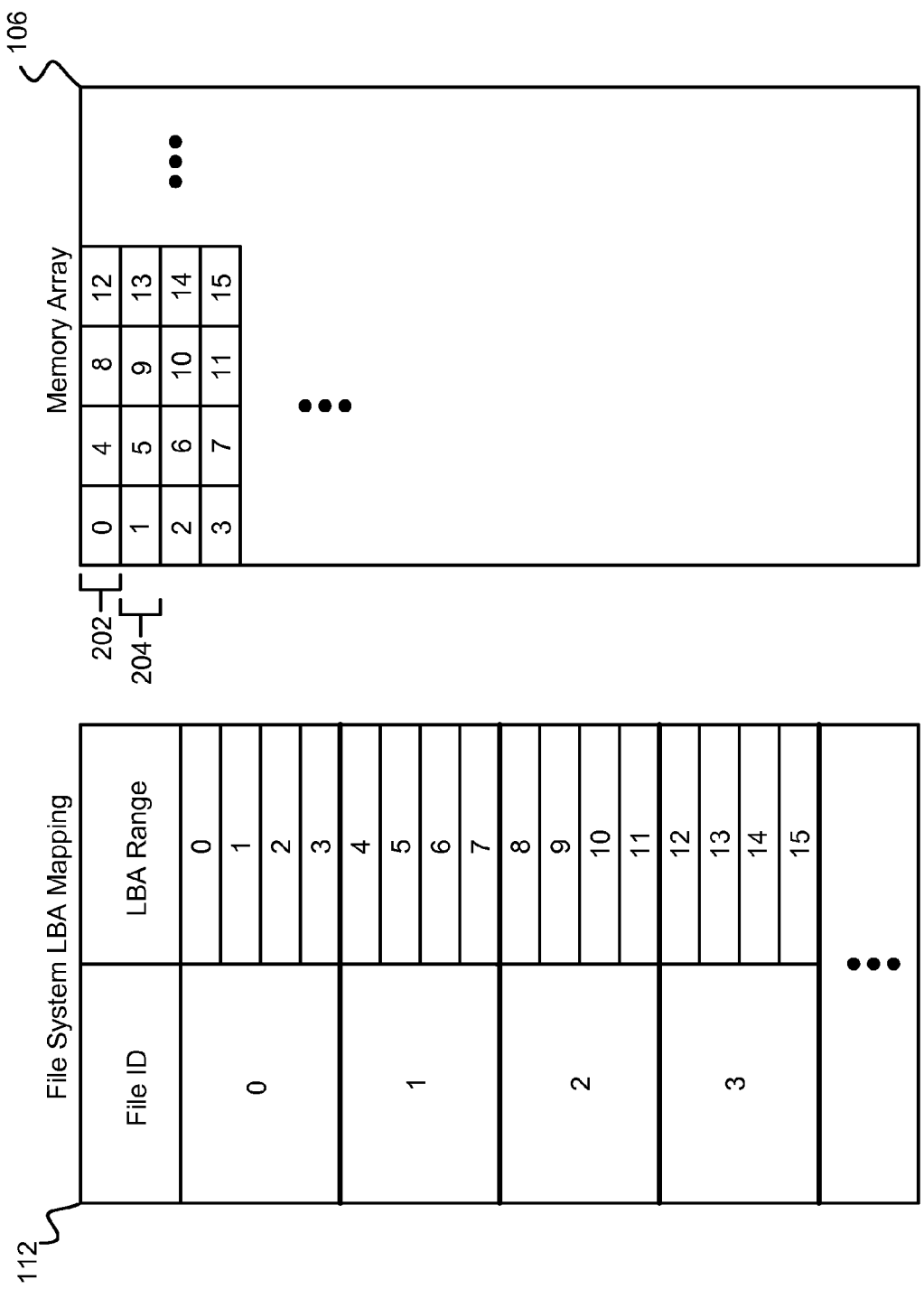
FIGS. 2A-2C illustrate an example data structure in a non-volatile memory for storing file system derived metadata.

FIG. 2 illustrates an example data structure in NVM device 104 for storing file metadata. Some file systems, write a page or chunk that describes file metadata, such as timestamps, name, path, etc. A new file is assigned a unique object ID number. Every data chunk within the file will contain this unique object ID within a spare area of the chunk. The file system can maintain a tree structure in memory 105 of the physical location of these chunks. When a chunk is no longer valid (e.g., the file is deleted, or parts of the file are overwritten), the file system can mark a byte in the spare area of the chunk as 'dirty'. When an entire block (e.g., 32 pages) is marked as dirty, the file system can erase the block and reclaim the space. If free space on the memory device is low, the file system can choose a block that has a mix of dirty and good pages, move the good pages to a new block, mark the old pages as dirty and erase the block. The process of moving good pages and erasing blocks is called garbage collection. In file systems, file data is written to blocks in the order received by the NVM device 104. Consequently, chunks belonging to two different files can be programmed as contiguous blocks in a memory array of NVM device 104.

Referring to the example file system logical block address (LBA) mapping shown in FIG. 2, Files 0-3 are mapped to LBA ranges. An LBA specifies the starting location of a block of data stored on memory array 106 of the NVM device 104. In the example shown, File 0 is mapped to LBA range 0-3, File 1 is mapped to LBA range 4-7, File 2 is mapped to LBA address range 8-11 and File 3 is mapped to LBA range 12-15.

The LBA mapping scheme described above has been simplified for this example. For example, a given file can be mapped to any size LBA range depending on the size of the file.

When a memory array 200 is programmed, chunks associated with different files can be programmed in contiguous portions 202, 204 of memory array 200. In the example shown, the first LBA of File 0 is mapped to a first contiguous portion 202 of memory array 200. The first LBA of File 0 is followed by the first LBA of File 1, which is followed by the first LBA of File 2 and so forth. Similarly, a second contiguous portion 204 of memory array 200 is programmed with the second LBA of File 0, followed by the second LBA of File 1, which is followed by the second LBA of File 2, and so forth. In this example, chunks from four different files, Files 0-3, are programmed in contiguous rows 202, 204 of memory array 106. In this example, each block is contained in a single row of memory array 200. In a practical non-volatile memory system, however, a single block can include any number of rows and columns of memory array 106.

Figure 2B:
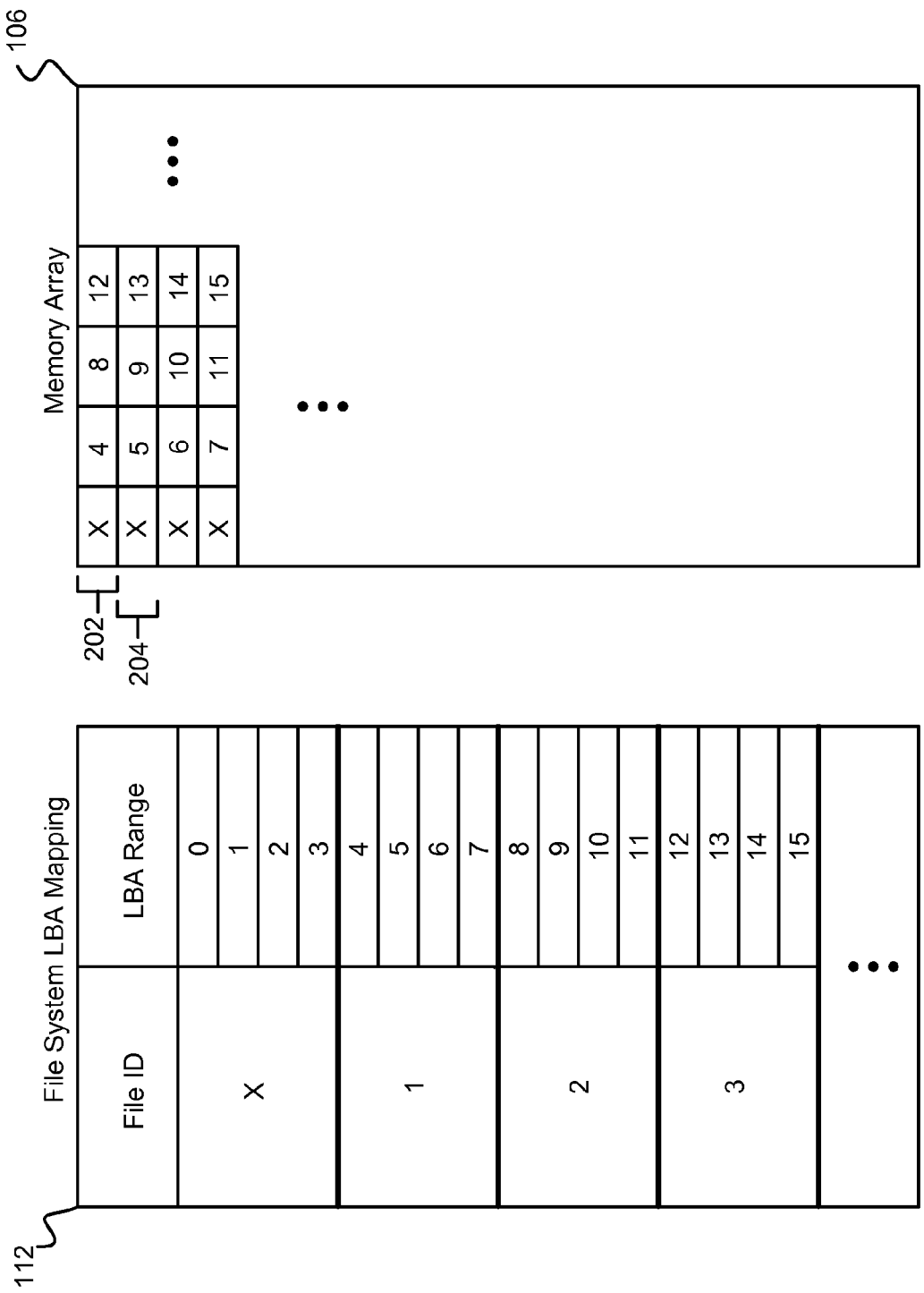

Referring to FIG. 2B, file 0 is deleted from the file system as indicated by the 'X'. The four blocks mapped to the LBA range 0-3 are now unused or no longer referenced to by file 0. For illustrative purposes, the corresponding contiguous portions 202, 204 of memory array 106 are also marked with an 'X'. During garbage collection, the controller 108 in NVM device 104 may try to reallocate blocks that are no longer referenced by the file system 112. In conventional memory systems, blocks in contiguous portions of a memory array may be excluded from garbage collection because the continuous portions contain a mix of good and bad blocks.

Figure 2C:
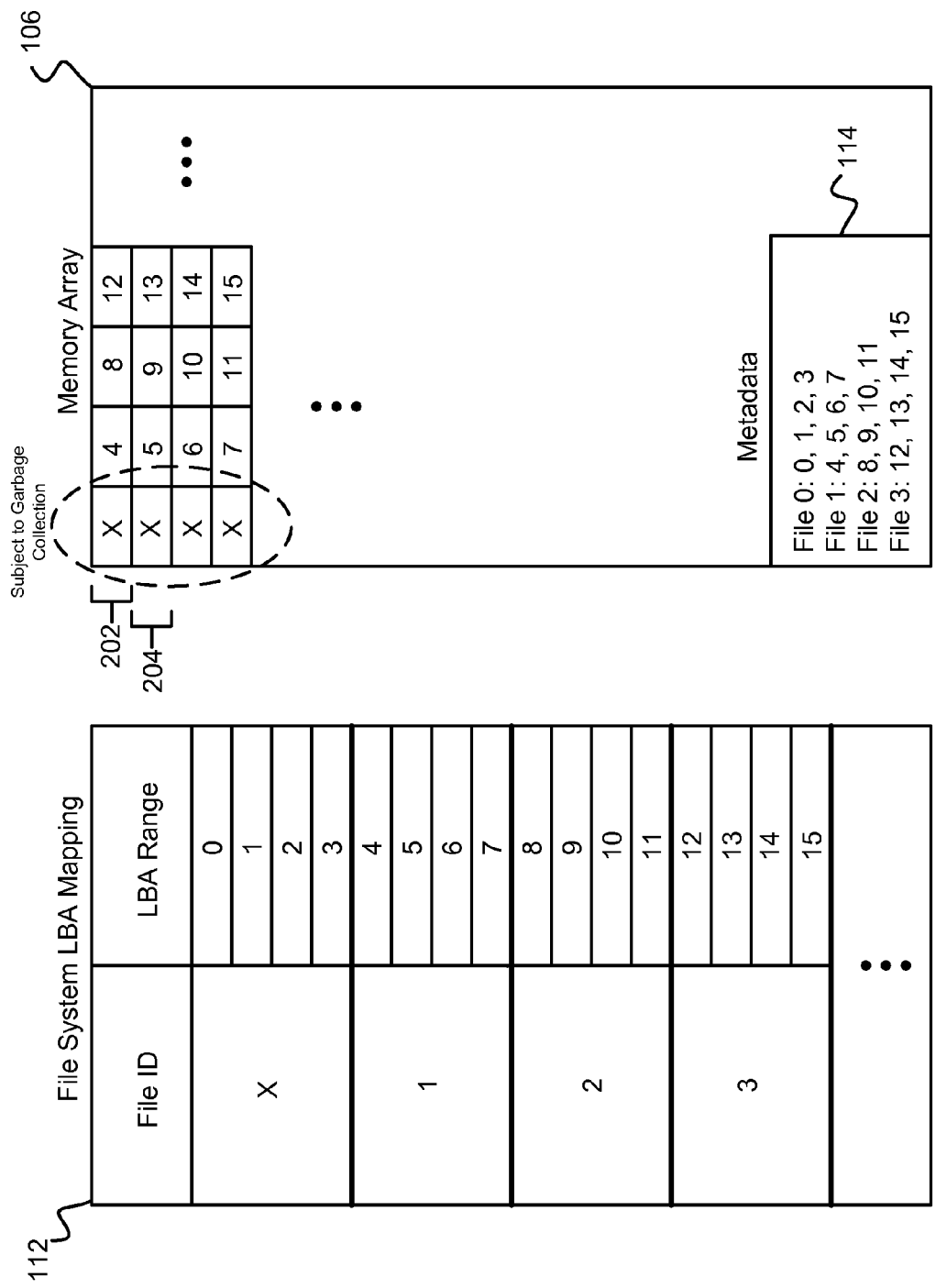

Referring to FIG. 2C, memory array 106 includes metadata 114 (e.g., unique object IDs for each file) programmed by the file system (e.g., files system 112). During garbage collection the metadata 114 can be retrieved and used to associate one or more blocks of physical memory to a file, so that all blocks storing data of the file can be reallocated for use by applications running on the host system 102. For example, the blocks of memory mapped to LBA range 0-3, and formerly reference to deleted File 0 can be reallocated for use by other applications. In this example, metadata 114 includes unique object IDs. However, any data that can be used to associate files in a file system with blocks of physical memory can be programmed by the file system as metadata 114.

Example Garbage Collection Process Using File Metadata

Figure 3:
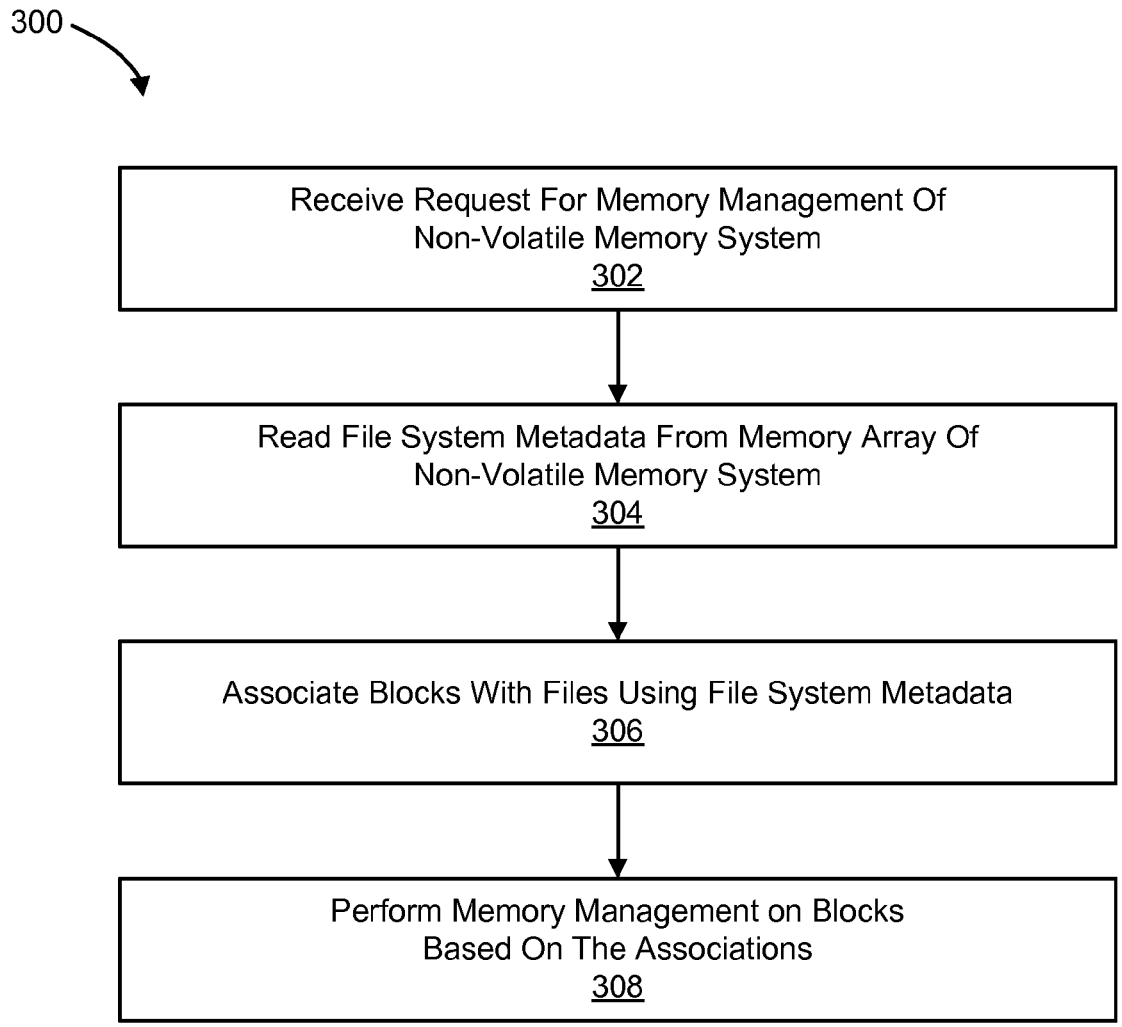
FIG. 3 is a flow diagram of an example process for managing non-volatile memory using file system derived metadata.

FIG. 3 is a flow diagram of an example process 300 for managing non-volatile memory using file system derived metadata. In some implementations, the process 300 begins when a request for memory management (e.g., garbage collection, wear leveling, bad block management) is received by a controller in an NVM device (302). The request can be sent from the host system 102 to the controller, or the request can be initiated by the controller in, for example, the case of a managed NVM device. Responsive to the request, the controller reads the file metadata from the memory array (304). The controller uses the metadata to associate blocks of physical memory with files of a file system of a host system (306). Based on the associations, the controller performs memory management (308).

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method performed by a processor in a non-volatile memory system, comprising:

receiving a request for a garbage collection operation on a memory array within a non-volatile memory device of the non-volatile memory system, wherein the memory array is configured to store file data and file metadata, wherein the file metadata includes data associating files stored in the memory array to logical block addresses within the memory array;

wherein the metadata further includes a unique object identifier and one or more ranges of logical block addresses associated with the unique object identifier;

wherein a given file is associated with a respective unique object identifier, and the given file includes one or more chunks, wherein each chunk includes, within the chunk, the respective unique object identifier that is associated with the given file;

in response to the request for the garbage collection operation, retrieving the file metadata programmed into the memory array by a file system; and identifying blocks of non-volatile memory for garbage collection based on the file metadata.

2. The method of claim 1, wherein the request for memory management includes a request for bad block management.

3. A non-volatile memory system, comprising:

a host channel coupling a host system and a non-volatile memory device including a memory array configured to store data and metadata, wherein the metadata comprises data associating files stored in the memory array to logical block addresses within the memory array;

wherein the metadata further includes a unique object identifier and one or more ranges of logical block addresses associated with the unique object identifier;

wherein a given file is associated with a respective unique object identifier, and the given file includes one or more chunks, wherein each chunk includes, within the chunk, the respective unique object identifier that is associated with the given file; and a controller included in the non-volatile memory device and coupled to the host channel, wherein the controller is configured to retrieve file metadata programmed into the memory array by a file system operated by the host system in response to the host channel receiving a request for a garbage collection operation, and wherein the controller is configured to identify blocks of non-volatile memory for garbage collection based on the file metadata.

4. The memory system of claim 3, wherein the request for memory management includes a request for bad block management.

5. A non-volatile memory system including a host system and a non-volatile memory device, the system comprising:

a processor in the host system configured to create a file and associated file metadata and to store the file and the file metadata within a same memory array of the non-volatile memory device; and a host channel coupling the host system and the non-volatile memory device, the host channel for programming a memory array in the non-volatile memory device with the file metadata, the file metadata including a unique object identifier assigned to the file and one or more ranges of logical block addresses associated with the unique object identifier;

wherein the file includes one or more chunks,, wherein each chunk includes, within the chunk, the respective unique object identifier that is associated with the file;

wherein in response to receiving a request for a garbage collection operation on the non-volatile memory device, the host channel is configured to retrieve the file metadata from the memory array to identify blocks of the non-volatile memory array to be erased and re-allocated.

6. The system of claim 5, comprising:

a controller in the non-volatile memory device, the controller configurable to use the file meta data for management of the memory array.

7. The system of claim 6, where management of the memory array includes one of garbage collection or wear leveling.

8. A non-volatile memory, comprising:

a memory array configured to store data and metadata, wherein the metadata comprises data associating files stored in the memory array to logical block addresses within the memory array;

a controller coupled to the memory array and configured to retrieve file metadata programmed into the memory array by a file system operated by a host system in response to a request for a garbage collection operation;

wherein the controller is configured to identify blocks within the non-volatile memory that include invalid data to be erased and re-allocated based on the file metadata;

wherein the metadata further includes a unique object identifier and one or more ranges of logical block addresses associated with the unique object identifier;

wherein a given file is associated with a respective unique object identifier, and the given file includes one or more chunks, wherein each chunk includes, within the chunk, the respective unique object identifier that is associated with the given file.

* * * * *